April 29, 1924.
H. SYNCK
MANURE SPREADER
Filed July 16, 1919　　2 Sheets-Sheet 1
1,492,005
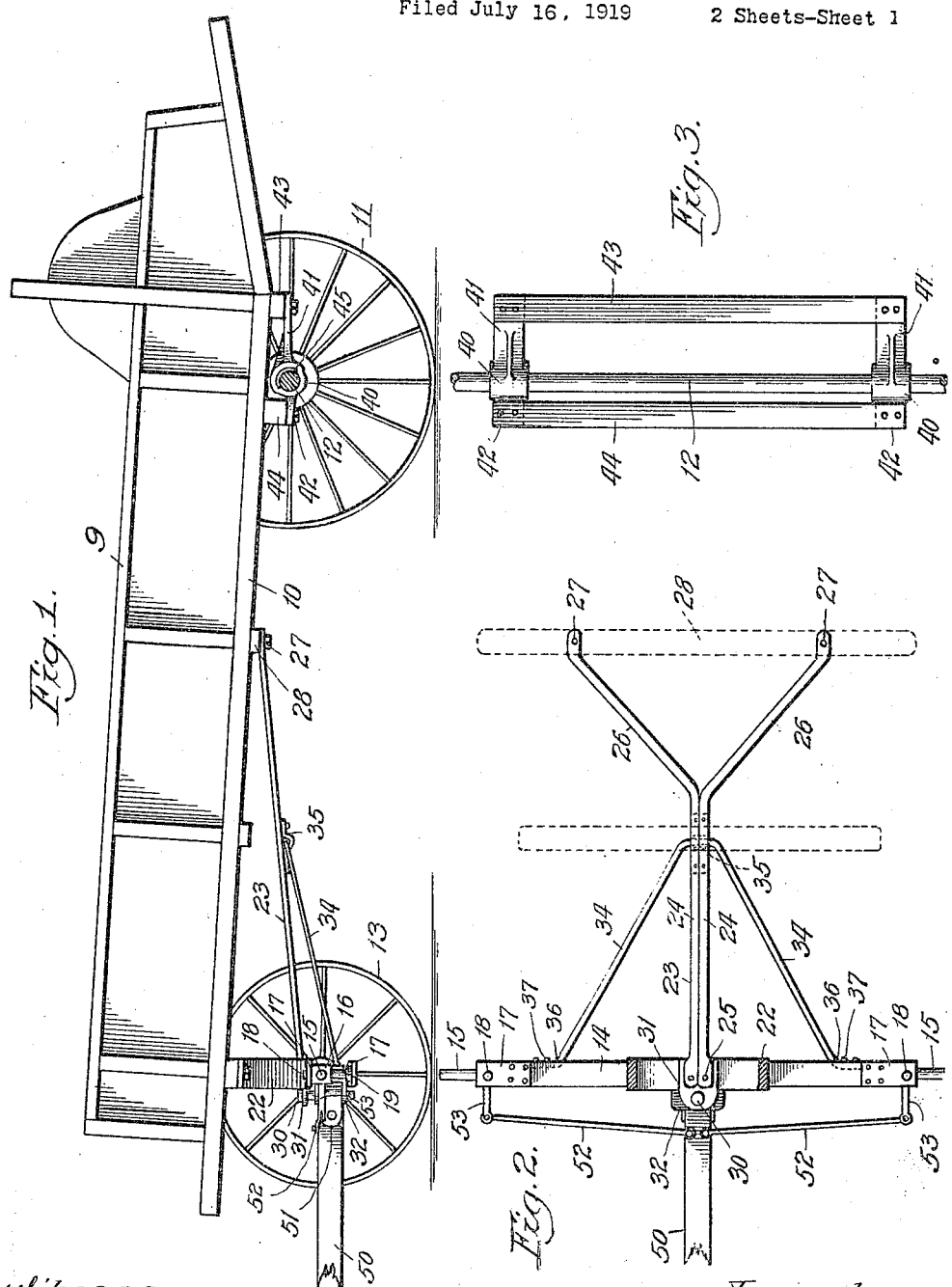
Witness:
John Enders
Inventor:
Henry Synck
by Fred Gerlach
his Atty.

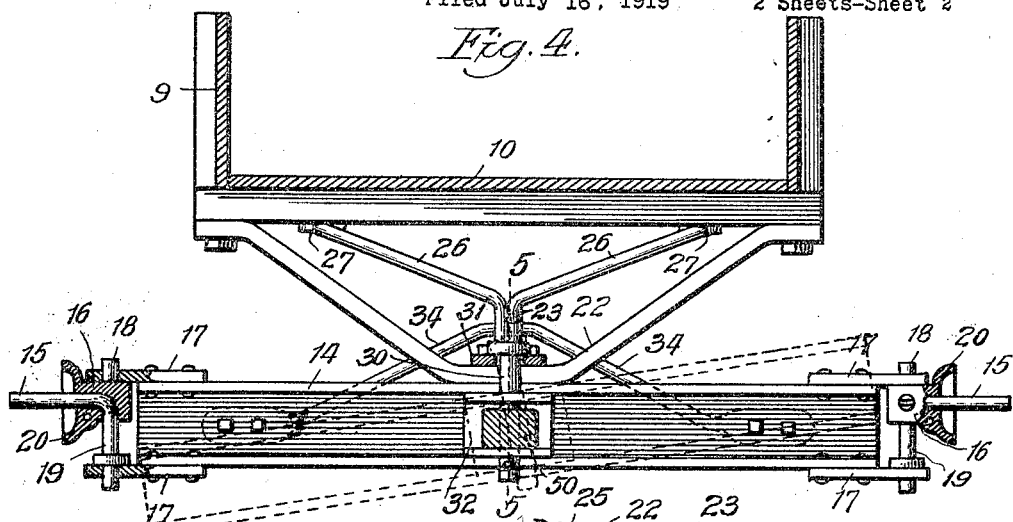

Patented Apr. 29, 1924.

1,492,005

UNITED STATES PATENT OFFICE.

HENRY SYNCK, OF COLDWATER, OHIO, ASSIGNOR, BY MESNE ASSIGNMENTS, TO THE NEW IDEA SPREADER COMPANY, OF COLDWATER, OHIO, A CORPORATION OF OHIO.

MANURE SPREADER.

Application filed July 16, 1919. Serial No. 311,167.

*To all whom it may concern:*

Be it known that I, HENRY SYNCK, a citizen of the United States, and a resident of Coldwater, in the county of Mercer and State of Ohio, have invented certain new and useful Improvements in Manure Spreaders, of which the following is a full, clear, and exact description.

The invention relates to manure spreaders.

One object of the invention is to provide improved running gear which is adapted for a low-down spreader and in which provision is made for preventing distorting stresses upon the body of the spreader as the result of depression in or obstructions on the ground over which the spreader is drawn.

In one type of spreader now in use, it is common practice to employ a rigid front axle and swivel-connections between the front wheels and the axle to render the spreader dirigible. In this construction, springs are not generally used between the carrying wheels and the body so that when one of the wheels drops into a depression or passes over an obstruction, the entire body and many of the operating parts are subjected to distortional stresses which interfere with the operation of the running parts and cause the bed and body to be twisted and warped.

One object of the invention is to provide an improved manure spreader in which the front wheels are disposed at the sides of the body and in which provision is made for relative vertical movement between them so that the bed and body of the spreader will not be subjected to twisting and distortion as the spreader passes over uneven ground.

A further object of the invention is to provide an improved bearing for the driving axle of the spreader.

The invention consists in the several novel features hereinafter set forth and more particularly defined by claims at the conclusion hereof.

In the drawings: Fig. 1 is a side elevation of a manure spreader embodying the invention. Fig. 2 is a plan of the front axle, the reach and draft-tongue. Fig. 3 is a plan of the rear or driving-axle and its bearings. Fig. 4 is a front elevation of the front-axle and its connections, the body being shown in section. Fig. 5 is a section taken on line 5—5 of Fig. 4. Fig. 6 is a detail of one of the rear-axle bearings. Fig. 7 is a section taken on line 7—7 of Fig. 6.

The invention is illustrated as embodied in a manure spreader comprising a box or receptacle 9 having a bottom 10. The distributer usually comprises a conveyor for feeding the manure in the body rearwardly towards the distributing mechanism (not shown), as well understood in the art. Rear carrying wheels 11 support a drive-axle 12 which is utilized to drive the distributer in any manner well understood in the art.

The supporting structure for the front of the spreader comprises carrying-wheels 13, one at each side of the spreader-body and a cross-axle 14 formed of an I-beam. Each front wheel 13 is mounted upon a stub-axle 15 which is secured to a bracket 16 and each bracket and stub-axle is pivoted for horizontal rotation in a pair of plates 17 secured to the top and bottom respectively of the axle 14. The pivotal connection between each stub-axle and the cross-axle 14 comprises a stud 18 on the bracket 16 and a vertical arm 19 integrally formed with the stub-axle. The bracket 16 is provided with a flange 20 which serves as a sand cap for the inner side of the hub of a wheel 13. The cross-axle 14 extends under an inverted arch bolster 22 which has its outer ends secured to the underside of the body of the spreader. This bolster is further secured against movement in fore and aft direction relatively to the body by a reach 23 made up of rods 24, each of which has its front end secured to the bolster at 25 and a rear divergent portion 26 secured, as at 27, to the cross-bar 28 which is secured to the underside of the body 9. The cross-axle 14 is connected to the body 9 by a pin 30 which passes vertically through a plate 31 which is fixed to the bolster 22 and a U-shaped clip 32 which is fixedly secured to the front of cross-axle 14. There is sufficient play between the pin 30 and the hole in the plate 31 to permit the vertical and transverse oscillation of the cross-axle so that the front carrying-wheels can rise or fall responsively to depression in or obstructions on the ground, to relieve the body of distortional stresses. To better secure the cross-axle 14 against fore and aft movement relatively to the bolster than would be effected by the pin 30 alone, a brace 34, having its rear portion connected to the reach 24 by clips 35 which permit a slight lateral oscillation of the brace with the cross-axle 14, is supplied. This brace comprises forwardly and laterally divergent members 36 which are bolted, as at 37, to the cross-axle adjacent its outer ends. This brace, while permitting vertical oscillation of the cross-axle 14 in a transverse plane, secures it against horizontal and longitudinal oscillation.

The draft-tongue 50 is pivoted in a clevis 51 through which the pin 30 extends. The tongue and clevis can swing laterally around pin 30. Steering rods 52 connect the tongue and arms 53 in the stub-axles respectively to control the direction of travel of the front-wheels from the tongue.

Another feature of the invention consists in the construction of the bearings for the rear or drive axle 12. There is one of these at each side of the body and each comprises a casting having cylindrical portion 40 and lugs 41 and 42 bolted to the bars 43 and 44 which are secured to the body of the machine, and a semi-cylindrical bushing 45 of wood or metal inserted in the cylindrical portion 40. This bushing is set obliquely as shown so that the load and the wear due to the draft of the machine and the resistance of the mechanisms driven by the axle will be applied to the bushing. The weight of the machine will press down onto the bearing and the stresses on the chains and draft of the beam will cause the axle rotating in it to bear against the back side of the bearing and, by setting the bushing in obliquely, the best results are attained. A flange 46 is formed on the inner end of the cylindrical portion 40 to retain the bushing against inward axial movement and the hub of one of the carrying-wheels 11 holds the bushing against movement in the opposite direction.

The invention exemplifies a manure spreader in which a laterally tiltable axle having pivoted stub-axles at its end are used so that warping or distortion of the box-body will be avoided and one in which it is not necessary to provide a special construction at the front of the box to permit the front wheels to turn thereunder. In other words, a low-down spreader in which the vehicle body is not distorted and in which dirigible stub-axles are used.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a manure spreader, the combination of a receptacle, front and rear carrying wheels, an axle for the rear wheels mounted in fixed relation to the receptacle, a bolster, a vertically tiltable front cross axle, dirigible stub-axles pivotally connected to the ends of the front axle respectively, a tongue pivoted to swing laterally and connected to the stub axles, a reach having its front end fixed to the bolster and its rear end directly secured to the receptacle, and brace-means between the reach and the front axle for holding it against horizontal turning.

2. In a manure spreader, the combination of a receptacle, front and rear carrying wheels, a rotatable rear axle mounted in fixed relation to the receptacle, a bolster fixed to the front portion of the receptacle, a vertically tiltable front axle connected to the bolster, dirigible stub-axles pivotally connected to the ends of the front axle respectively, a reach having its front end rigidly secured to the bolster and its rear end rigidly and directly secured to the receptacle, brace-means between the reach and the front axle to secure the latter against horizontal turning, and a tongue pivoted to the axle to swing laterally and connected to swing the stub-axles.

HENRY SYNCK.